United States Patent [19]
Jäckel

[11] Patent Number: 5,042,632
[45] Date of Patent: Aug. 27, 1991

[54] VIBRATION DAMPING APPARATUS

[75] Inventor: Johann Jäckel, Baden-Baden, Fed. Rep. of Germany

[73] Assignee: Luk Lamellen und Kupplungsbau GmbH, Bühl, Fed. Rep. of Germany

[21] Appl. No.: 328,933

[22] Filed: Mar. 27, 1989

[30] Foreign Application Priority Data

Mar. 26, 1988 [DE] Fed. Rep. of Germany ....... 3810434

[51] Int. Cl.⁵ .......................... F16D 3/66; F16D 13/50
[52] U.S. Cl. ..................... 192/106.2; 74/574; 192/304; 192/48.3; 192/106.1; 464/45; 464/68
[58] Field of Search ................ 192/30 V, 48.3, 70.17, 192/106.1, 106.2, 56 R, 107 C; 464/45, 66, 68; 74/574

[56] References Cited

U.S. PATENT DOCUMENTS

| | | | |
|---|---|---|---|
| 3,624,770 | 11/1971 | Fujita | 192/107 C |
| 4,274,524 | 6/1981 | Nakane | 192/48.3 |
| 4,592,460 | 6/1986 | Kittel | 192/106.2 |
| 4,634,398 | 1/1987 | Alas | 192/106.2 |
| 4,732,250 | 3/1988 | Maucher et al. | 192/70.17 |
| 4,782,933 | 11/1988 | Jackel et al. | 192/106.2 X |
| 4,783,895 | 11/1988 | Reik | 29/434 |
| 4,889,009 | 12/1989 | Friedmann et al. | 192/48.3 X |
| 4,906,220 | 3/1990 | Worner et al. | 74/574 X |

FOREIGN PATENT DOCUMENTS

| | | | |
|---|---|---|---|
| 3411092 | 3/1984 | Fed. Rep. of Germany | 464/66 |
| 3505069 | 2/1986 | Fed. Rep. of Germany | . |
| 2049101 | 12/1980 | United Kingdom | 192/106.2 |
| 2153929 | 8/1985 | United Kingdom | 192/48.1 |

*Primary Examiner*—Rodney H. Bonck
*Attorney, Agent, or Firm*—Peter K. Kontler

[57] ABSTRACT

A vibration damping apparatus which is installed in the power train between the engine and the variable-speed transmission of a motor vehicle has two coaxial flywheels which are rotatable relative to each other against the opposition of one or more elastic dampers and a slip clutch. The slip clutch is connected in series with the damper or dampers by an axially stressed diaphragm spring.

35 Claims, 5 Drawing Sheets

VIBRATION DAMPING APPARATUS

CROSS-REFERENCE TO RELATED CASE

Certain features of the apparatus of the present invention are disclosed and claimed in commonly owned copending patent application Ser. No. filed Mar. 27, 1989 by Hermann Langeneckert for "Vibration Damping Apparatus" now U.S. Pat. No. 4,961,487.

BACKGROUND OF THE INVENTION

The invention relates to improvements in vibration damping apparatus, especially for use in power trains between the engines and the variable-speed transmissions of motor vehicles. More particularly, the invention relates to improvements in vibration damping apparatus of the type wherein a first rotary component can be connected to the engine, a second rotary component (which is coaxial with and is angularly movable relative to the first component) is connectable with the input element of the transmission, preferably by way of a friction clutch, and the two components can rotate relative to each other against the opposition of vibration damping means including at least one elastic damper and a slip clutch which is connected in series with the damper by a disc-shaped member.

Vibration damping apparatus of the above outlined character are disclosed, for example, in German Pat. No. 35 05 069. A drawback of the patented apparatus is that it is overly complex and expensive, mainly because its vibration damping means employ a large number of separately produced parts.

OBJECTS OF THE INVENTION

An object of the invention is to provide a relatively simple, inexpensive and reliable vibration damping apparatus wherein the vibration damping means include a small number of parts.

Another object of the invention is to provide an apparatus which is constructed and assembled in such a way that its useful life is longer than that of heretofore known apparatus.

A further object of the invention is to provide a novel and improved method of assembling the vibration damping means of the above outlined apparatus.

An additional object of the invention is to provide a power train which embodies the above outlined apparatus.

Still another object of the invention is to provide a motor vehicle with a power train which is installed between the engine and the variable-speed transmission and embodies the above outlined apparatus.

A further object of the invention is to provide a novel and improved combination of at least one elastic damper and a slip clutch for use in the above outlined vibration damping apparatus.

Another object of the invention is to provide a novel and improved combination of one, two or more flywheels and vibration damping means for use in the above outlined apparatus.

SUMMARY OF THE INVENTION

The invention is embodied in an apparatus for damping vibrations, particularly in a power train between an engine and a variable-speed transmission in a motor vehicle. The improved apparatus comprises at least two components which are rotatable relative to each other and include a first component which is connectable with the engine and a second component which is connectable with the transmission, particularly by way of a friction clutch. The apparatus further comprises vibration damping means operating between the first and second components and including at least one elastic damper, a slip clutch and means for connecting the slip clutch in series with the damper. The connecting means includes a stressed diaphragm spring, particularly a disc-shaped diaphragm spring.

The diaphragm spring can be provided with windows, and the vibration damping means further comprises energy storing elements which are disposed in the windows and act in the circumferential direction of the first and second components.

The extent of stressing of the diaphragm spring determines the slip moment of the slip clutch.

The apparatus further comprises means for stressing the diaphragm spring, and such stressing means includes first and second annular stressing members one of which can be disposed radially outwardly of or can extend radially outwardly beyond the other stressing member. The diaphragm spring is disposed between the first and second stressing members. Means is provided for non-rotatably securing the stressing members to one of the first and second components.

The diaphragm spring preferably comprises an annular main section and windows which are provided therein outside of the main section. The aforementioned energy storing elements are installed in the windows and act in the circumferential direction of the first and second components. The windows can be disposed radially outwardly of the main section of the diaphragm spring. The latter further comprises radial projections which extend from the main section and alternate with the windows. If the windows are located radially outwardly of the main section, the projections also extend radially outwardly and each energy storing element is acted upon by one of the projections.

The aforementioned stressing members subject the diaphragm spring to an axial stress, and the apparatus can further comprise means for fixedly securing the stressing members to each other against axial movement relative to one another.

One of the first and second components has first abutments for the energy storing elements, and the diaphragm spring has second abutments for such energy storing elements Each energy storing element is disposed between a first and a second abutment, as seen in the circumferential direction of the first and second components, and each energy storing element is stressed by the respective abutments in response to angular movement of the one component and the diaphragm spring relative to each other.

The first and second components can constitute the first and second flywheels of a composite flywheel. The apparatus preferably further comprises antifriction bearing means between the first and second flywheels, and a friction clutch between the second component and the transmission.

One of the first and second component can constitute an input element of the damper, and the diaphragm spring can constitute the output element of such damper. The slip clutch then serves to connect the diaphragm spring with the other of the first and second components.

One of the first and second components can include sections (e.g., in the form of dished shells made of a metallic sheet material or in the form of metallic castings) which define at least one annular chamber having a sealed radially outermost portion and serving to confine a supply of viscous fluid (e.g., silicon oil or lubricating grease). At least a portion (particularly the damper) of the vibration damping means is preferably installed in the annular chamber. The arrangement is preferably such that the damper and the slip clutch are located in the chamber.

The chamber includes an annular compartment for the energy storing elements of the damper. Such compartment is at least partially filled with viscous liquid when the chambered component rotates. The energy storing elements can constitute coil springs, and at least one of the sections which define the chamber can be provided with abutments for the coil springs. Additional abutments for the coil springs are provided by the aforementioned projections of the diaphragm spring. Such projections extend into the annular compartment of the chamber and alternate with the coil springs.

The chamber has a radially innermost section which is at least substantially sealed from the surrounding atmosphere by the diaphragm spring and one of the stressing members. The stressing members include annular portions which stress the diaphragm spring, and the annular portion of the one stressing member is preferably located radially outwardly of the annular portion of the other stressing member.

The chamber is preferably formed in the first component (i.e., in the component which is connectable to the engine). A first section of such first component is connectable to a crankshaft which is driven by the engine, and the first section has an axial protuberance which is surrounded by the antifriction bearing means. A second section of the first component is disposed between the first section and the second component and surrounds the antifriction bearing means on the protuberance. One of the stressing members is disposed axially between the first section of the first component and the diaphragm spring, and this one stressing member cooperates with the diaphragm spring to at least substantially seal the radially innermost portion of the annular chamber between the first and second sections of the first component. The outer diameter of this one stressing member is greater than the outer diameter of the other stressing member.

The apparatus can further comprise plug-in means for non-rotatably but axially movably coupling the stressing members to the second component. The coupling means comprises first profiles provided on the radially innermost portion of at least one of the stressing members and second profiles which are carried by the second component. The profiles can resemble or constitute teeth, and the first profiles mate with the second profiles so that they can transmit torque between the one stressing member and the second component. The coupling preferably further comprises means for bracing the first profiles against the second profiles in the circumferential direction of the first and second components; this ensures that the parts of the coupling cannot rattle, especially when the engine which drives the first component is idling while the aforementioned friction clutch is engaged but the transmission is not shifted into a forward or reverse gear. The bracing moment which is generated by the bracing means is preferably greater than (a) the moments which are generated by variations of rotational speed due to non-uniformity of rotation of the engine, and (b) the moment of inertia of the second component and of the mass or masses which rotate with the second component. The bracing moment is preferably between 5 and 30 Nm, more preferably between 8 and 20 Nm, and most preferably about 14 Nm.

The second profiles of the coupling can be provided directly on the second component or at the periphery of a substantially disc-shaped member which is secured (e.g., riveted) to the second component.

The novel features which are considered as characteristic of the invention are set forth in particular in the appended claims. The improved vibration damping apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
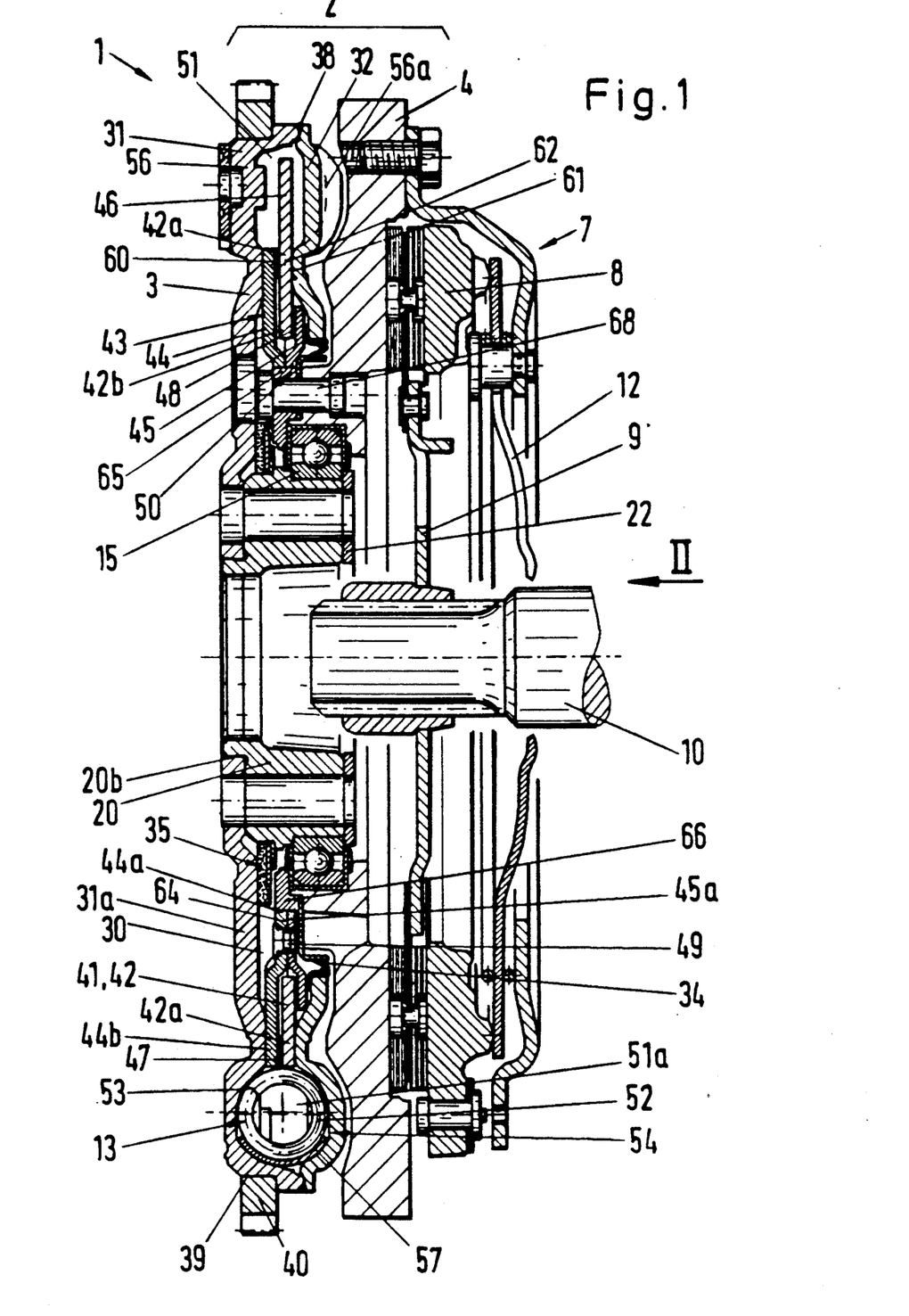
FIG. 1 is an axial sectional view of a vibration damping apparatus which embodies one form of the invention.

FIG. 1 shows a vibration damping torque transmitting apparatus 1 which comprises a composite flywheel 2 having a first flywheel component 3 and a second flywheel component 4. The component 3 can be connected with the output element of an internal combustion engine in a motor vehicle (e.g., in a manner as shown in commonly owned U.S. Pat. No. 4,732,250) by a set of bolts, bolts and nuts or the like. The component 4 carries a friction clutch 7 which engageable to enable the engine to transmit torque to the input element 10 of a variable-speed transmission of the type used in motor vehicles. The clutch 7 comprises a clutch plate 9 which is non-rotatably secured to the input element 10 of the transmission and is disposed between an axially movable pressure plate 8 and the component 4. The cover or housing of the clutch 7 supports a tiltable diaphragm spring 12 which normally biases the pressure plate 8 axially against the clutch plate 9 whereby the latter is biased against and is rotated by the component 4 when the engine is running. In order to disengage the clutch 7, the radially inwardly extending prongs of the diaphragm spring 12 are moved axially toward the component 4 to thereby tilt the diaphragm spring and to enable the pressure plate 8 to release the clutch plate 9, i.e., the plate 9 then no longer receives torque from the component 4.

The apparatus 1 further comprises a damper 13 which opposes rotation of the components 3 and 4 relative to each other. An antifriction bearing 15 is interposed between the components 3 and 4.

The component 3 includes two sections 31, 32 which constitute a housing and define an annular chamber 30 for the damper 13. The sections 31, 32 are made of a metallic sheet material and resemble relatively flat annular shells having their radially outermost portions mechanically and sealingly connected to each other in order to ensure that the chamber 30 can receive and retain a supply of viscous liquid or paste, such as lubricating grease. The means for sealingly connecting the sections 31, 32 to each other comprises a welded seam 38. Such seam can be formed in a laser beam or electron beam welding machine, or in a machine which is designed to bond contacting portions of the sections 31, 32 to each other as a result of the application of high-strength alternating current at low voltage to heat the contacting portions and to weld them to each other in response to the application of requisite pressure.

The section 32 is disposed between the section 31 and the component 4, and the section 31 has an axial protuberance 20 which is surrounded by the aforementioned antifriction bearing 15. The protuberance 20 can constitute a separately produced part which is provided with a centering surface 20b for a radially extending portion 31a of the section 31. A washer-like retainer 22 is provided to engage and hold the inner race of the bearing 15 in a desired axial position with reference to the protuberance 20. The fastener means for securing the retainer 22 to the adjacent end portion of the protuberance 20 can include the aforementioned bolts or bolts and nuts which are used to secure the section 31 of the component 3 to the output element of the engine.

The peripheral surface 39 of the section 31 is surrounded by a customary starter gear 40. As can be seen in FIG. 1, the wall thickness of the section 31 exceeds that of the section 32. A standard sealing device 34 is provided between the radially inner portion of the section 32 and the component 4 to seal the innermost portion of the annular chamber 30.

The means for opposing rotation of the components 3 and 4 relative to each other further comprises a friction generating device 35 which is also installed in the chamber 30. This friction generating device surrounds the protuberance 20 and is disposed between the radially extending portion 31a of the section 31 and the antifriction bearing 15.

The output element 41 of the damper 13 is a flange-like member (hereinafter called flange for short) which is installed axially between the sections 31, 32 of the component 3. The radially inner portion 42 of the flange 41 is force-lockingly connected to the component 4 by a slip clutch 43, and the flange 41 is flanked by two disc-shaped stressing members 44, 45 constituting the output element of the slip clutch 43.

Figure 2:
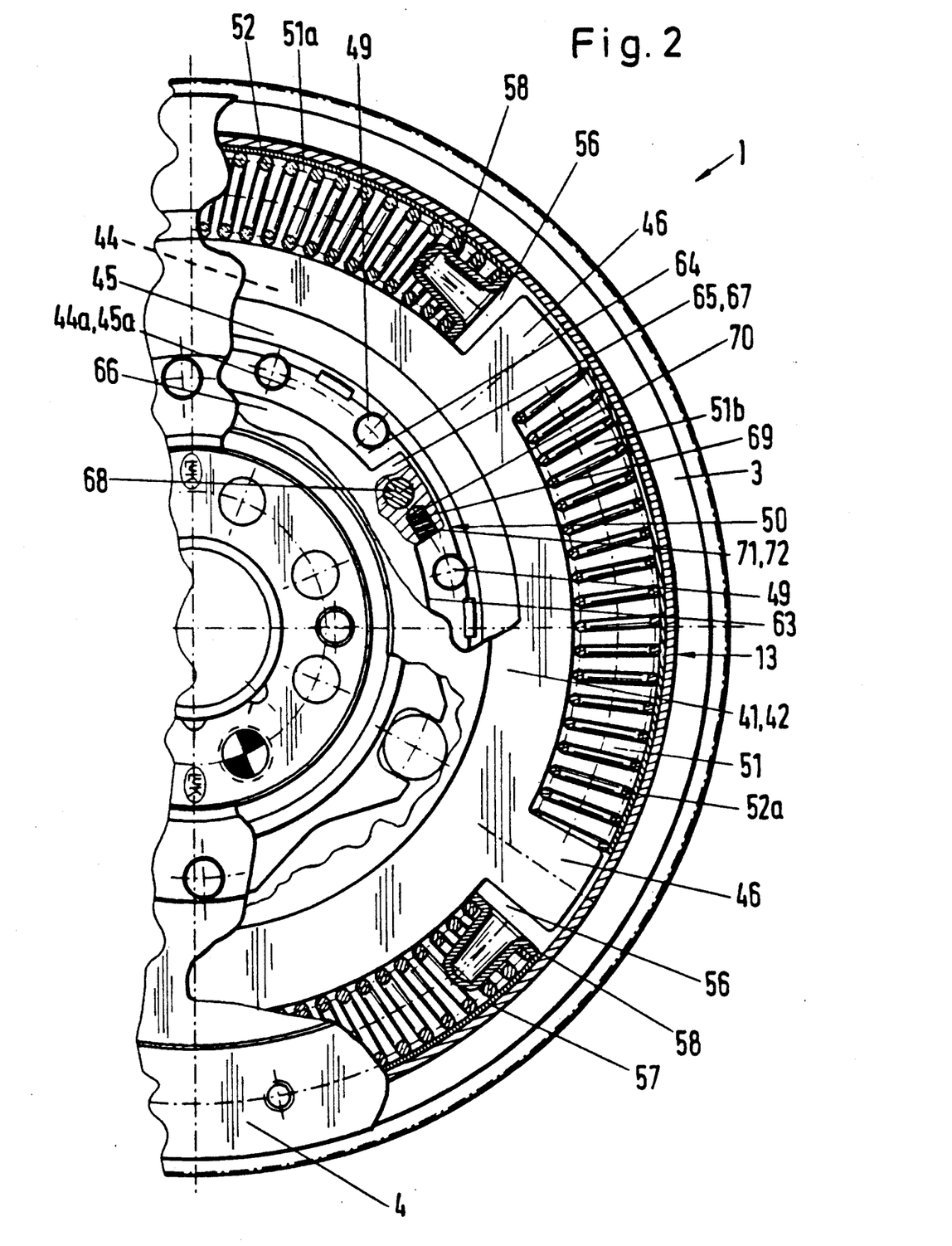
FIG. 2 is a fragmentary side elevational view as seen in the direction of arrow II in FIG. 1, portions of the apparatus being shown in section taken in a plane at right angles to the plane of FIG. 1.

In accordance with a feature of the invention, the flange 41 constitutes a diaphragm spring which is installed between the members 44, 45 in axially stressed condition. Prior to being installed in the apparatus 1 of FIGS. 1 and 2, the flange 41 has a slightly (or even a rather pronounced) frustoconical shape not unlike any standard diaphragm spring. As can be seen in FIG. 2, the flange 41 comprises the aforementioned circumferentially complete washer-like main portion or section 42 and radial projections in the form of arms 46 which extend outwardly from and beyond the main section 42. When installed between the stressing members 44 and 45, the main section 42 of the flange 41 is flattened and its radially outer portion 42a bears against the adjacent portion 44b of the stressing member 44. At the same time, a radially inner portion 42b of the main section 42 abuts the stressing member 45. The apparatus 1 further comprises friction linings 47, 48 which are installed at opposite sides of the main section 42 Thus, the lining 47 is disposed between the radially outer portion 44b of the stressing member 44 and the radially outer portion 42a of the main section 42, and the lining 48 is installed between the radially inner portion 42b of the main section 42 and the adjacent part of the stressing member 45.

At least one of the linings 47, 48 can be omitted. For example, the stressing member 44 or 45 can be provided with a corrugation (not shown) or an analogous projection which bears directly against the respective side of main section 42 of the flange 41. This ensures the generation of friction directly between two metallic parts. The flange 41 and the stressing members 44, 45 can be made of steel. It is also within the purview of the invention to omit the friction lining 47 and/or 48 and to provide the respective side or sides of the main section 42 with one or more corrugations or other projections which are in direct frictional engagement with the stressing member 44 and/or 45. The illustrated friction linings 47, 48 are formlockingly connected or bonded to the respective stressing members 44 and 45.

FIG. 1 shows that the outer diameter of the stressing member 44 (which is disposed between the section 31 and the flange 41) is greater than the outer diameter of the stressing member 45. The latter is installed between the flange 41 and the section 32, i.e., between the flange and that section of the component 3 which is nearer to the component 4. The major portion of the stressing member 45 extends substantially radially of the common axis of the components 3, 4 and antifriction bearing 15. The stressing members 44, 45 have dished innermost portions 44a and 45a which are surrounded by the flange 41 and are fixedly connected to each other by rivets 49 or other suitable securing means. Furthermore, the stressing members 44, 45 (which are the output element of the slip clutch 43) are non-rotatably coupled to the component 4. The coupling 50 between the stressing members 44, 45 and the component 4 is a so-called plug-in or plug-and-socket connection which can transmit torque. Such connection enables the component 4 to become detached from the stressing members 44, 45 by moving axially and away from the flange 41, and vice versa.

It is presently preferred to construct at least one of the stressing members 44, 45 (particularly the larger-diameter stressing member 44) in the form of a diaphragm spring which exhibits a certain amount of conicity prior to installation in the apparatus 1. The arrangement is preferably such that the stressing member 44 is flattened, under the bias of the flange 41, at least in the region where it is immediately adjacent the flange. In other words, that portion (44b) of the stressing member 44 which is disposed in the region of the friction lining 47 is parallel with the adjacent part of the flange 41. When the stressing member 44 and the flange 41 are installed in the space between the sections 31, 32 of the component 3, the conicity of the stressing member 44 is reduced due to its own elasticity and under the action of the flange (diaphragm spring) 41 so that at least the radially overlapping portions of the flange 41 and stressing member 44 are at least substantially parallel to each other. Such design of the slip clutch 43 ensures proper engagement of friction linings 47, 48 with the respective sides of the flange 41 in assembled condition of the apparatus 1.

If necessary, the stressing member 45 can also constitute a frustoconical diaphragm spring which is flattened in response to insertion between the flange 41 and the section 32 of the component 3.

The utilization of one or two frustoconical stressing members which act not unlike diaphragm springs renders it possible to reduce the thickness of such stressing members and to thus reduce the space requirements of the apparatus in the axial direction of the components 3 and 4. The conicity of the stressing member 45 and/or 44 is preferably in the range of 0.5° to 5°. The axial deformability of the stressing member 45 and/or 44 is preferably between 0.2 and 2 mm. In the apparatus 1 of FIGS. 1 and 2, the axial movability of the stressing member 44 is 0.9 to 1.1 mm, and the axial movability of the stressing member 45 is 0.1 to 0.3 mm. The axial movability refers to those portions of the stressing members 44, 45 which are disposed radially outwardly of the rivets 49, i.e., between the outermost portions of the rivets 49 and the radially outermost portions of the stressing members 44 and 45.

It is also possible to employ a more or less rigid flange 41. The means for generating torque which is transmitted by the slip clutch 43 then includes one of the stressing members 44, 45, preferably the stressing member 44. This renders it possible to employ a non-elastic flange 41 or to employ a flange exhibiting an elasticity (e.g., only its innate elasticity) which is inferior to that of the stressing member 44. The stressing member 44 then constitutes and acts as a genuine membrane or diaphragm spring.

The radially outermost portion of the chamber 30 constitutes an annular compartment 51 which is divided into arcuate portions 51a, 51b for energy storing elements in the form of coil springs 52, 52a. The neighboring coil springs 51, 51a are separated from each other by the radially extending projections 46 of the flange 41; such projections extend into the compartment 51. Thus, the end convolutions of the coil springs 52, 52a bear against the adjacent projections 46 when the flange 41 is caused to change its angular position with reference to the sections 31, 32 of the component 3.

The major portion of the compartment 51 is formed by arcuate grooves 53, 54 which are respectively provided in the inner sides of the sections 31, 32. Such grooves can be formed as a result of suitable deformation of the sections 31, 32 if these sections are made of a metallic sheet material. The grooves 53, 54 receive those portions of the coil springs 52, 52a which extend axially beyond the flange 41.

FIG. 1 shows that the configuration of the surfaces bounding the grooves 53, 54 closely approximates and almost matches the outlines of the respective portions of the coil springs 52 and 52a. This ensures that the surfaces bounding the radially outermost portions of the grooves 53 and 54 can serve as a guide means for radially outermost portions of convolutions of the coil springs 52 and 52a when the coil springs are compressed as a result of angular movement of the component 3 and flange 41 relative to each other. Moreover, the radially outermost portions of surfaces bounding the grooves 53, 54 serve as stops for the adjacent convolutions of the coil springs 52, 52a when the component 3 is driven and the coil springs tend to move radially outwardly under the action of centrifugal force.

In order to reduce wear upon the sections 31 and 32, it is advisable to employ a wear-resistant track 57 which is installed in the radially outermost portion of the compartment 51 and is contacted by convolutions of the coil springs 52, 52a, at least when the engine drives the component 3 of the composite flywheel 2. The hardness of the material of the track 57 can greatly exceed that of the sections 31 and 32. As can be seen in FIG. 1, the track 57 can extend along an arc of more than 90° and even close to 180°.

The means for causing the coil springs 52, 52a to store energy in response to angular movement of the component 3 and flange 41 relative to each other includes the aforementioned projections 46 of the flange 41 and suitable projections or abutments 56, 56a which are disposed in pairs and flank the respective projections 46. The illustrated projections 56, 56a are integral parts of the sections 31, 32 and extend into the respective grooves 53, 54. Such projections can be made at the time the sections 31, 32 are respectively provided with their grooves 53 and 54.

FIG. 2 shows that, when the apparatus 1 is idle and the flange 41 is maintained in a neutral position, the angular positions of the projections 46 on the flange 41 and of the projections 56, 56a on the sections 31, 32 relative to each other are such that the projections 46 which engage the coil springs 52 are angularly offset with reference to the adjacent projections 56, 56a, and that the projections 46 which engage the coil springs 52a are in line with the adjacent projections 56, 56a.

FIG. 2 further shows cupped inserts 58, one for each coil spring 52 and each extending into one end portion of the respective coil spring 52. The cross-sectional outlines of the inserts 58 equal or approximate the cross-sectional outline of the compartment 51, and each insert 58 abuts the adjacent pair of projections 56, 56a. The purpose of the inserts 58 is disclosed in numerous United States and foreign patents and in numerous pending United States and foreign patent applications of the assignee of the present application, e.g., in commonly owned U.S. Pat. No. 4,783,895.

The sections 31, 32 of the first component 3 include annular portions 60, 61 which have confronting smooth surfaces defining an annular passage or channel 62 for the flange 41. As can be seen in FIG. 1, the passage 62 receives the radially outer portion 42a of the main section 42 of the flange 41, the radially outer portion 44b of the stressing member 44, and the friction lining 47 which is disposed between the flange 41 and the stressing member 44. The width of the passage 62 slightly exceeds (e.g., by 0.5 to 1.5 mm) the combined thickness of the parts which are disposed between the annular portions 60 and 61. This ensures that a narrow, clearance or gap is established between the main section 42 of the flange 41 and the section 32 and/or between the section 31 and the stressing member 44.

The liquid in the chamber 30 is a viscous substance, such as silicon oil or lubricating grease. This liquid at least partially fills the compartment 51 of the chamber 30 when the components 3 and 4 rotate. The arrangement may be such that the liquid completely fills the compartment 51 when the component 3 is rotated or that the compartment 51 is only partially filled with liquid.

When the component 3 is caused to change its angular position relative to the component 4 and/or vice versa, the inserts 58 in the arcuate sections 51a of the compartment 51 act not unlike pistons to establish a viscous or hydraulic damping action by causing a certain amount of liquid to leave the compartment 51 via passage 62 when the coil springs 52 are caused to store energy as a result of angular displacement of one of the components 3 and 4 relative to the other component.

The stressing members 44, 45 which constitute the output element of the slip clutch 43 define a centrally located opening 63 bounded by an internal surface which is provided with radially inwardly extending first profiles 64 mating with radially outwardly extending second profiles 65 provided at the periphery of a disc-shaped member 66. The latter is fixedly secured to the component 4 by rivets 68 or other suitable fastener means. The profiles 64 and 65 are in torque-transmitting engagement but are movable relative to each other in the axial direction of the components 3 and 4. For example, the stressing members 44, 45 can be provided with four equidistant first profiles 64, and the disc-shaped member 66 is then provided with four equidistant second profiles 65. The first profiles 64 alternate with recesses in the form of tooth spaces 67 for the second profiles 65. The shanks of the rivets 68 extend through the second profiles 65. The radially innermost portion of the disc-shaped member 66 further serves as an axial stop for the outer race of the antifriction bearing 15.

The profiles 64 and 65 form part of the aforementioned axial plug-in coupling 50 which permits optimum axial positioning of stressing members 44, 45 (and hence also of the flange 41) between the sections 31, 32 of the component 3. This renders it possible to ensure that the parts (44, 47, 41) which are disposed in the passage 62 leave one or two very narrow clearances for the flow of viscous liquid between the compartment 51 and the adjacent portion of the chamber 30, e.g., under the action of the cupped inserts 58. Thus, the combined thickness of the parts 41, 44, 47 in the passage 62 must be only slightly less than the axial distance between the annular portions 60, 61 of the sections 31 and 32. This greatly enhances the hydraulic or viscous damping action which is generated when the inserts 58 are caused to expel liquid from the compartment 51. Another advantage of the coupling 50 is that it renders it possible to increase axial tolerances between the neighboring surfaces of parts which constitute the vibration damping means and the composite flywheel 2.

FIG. 2 shows that one radially extending flank 71 of at least one second profile 65 is provided with a recess in the form of a blind bore or hole 69 extending in the circumferential direction of the components 3, 4 and receiving a resilient bracing member in the form of a coil spring 70 which acts upon one radially extending flank 72 of the adjacent first profile 64 to thus eliminate play between the profiles 64, 65 and to thereby greatly reduce or completely eliminate clattering, rattling and/or other noise which would develop in the absence of one or more coil springs 70. The illustrated coil spring 70 bears against the bottom surface in its bore 69 and bears against the adjacent flank 72 of the first profile 64. Each coil spring 70 is installed in stressed condition so that one flank 72 of each first profile 64 is always urged against the adjacent flank 71 of the neighboring second profile 65 because the coil spring or springs 70 urge the other flank 72 of each first profile 64 away from the adjacent flank 71 of the neighboring second profile 65.

The number of coil springs 70 can but need not match the number of second profiles 65. Furthermore, it is equally possible to provide a recess 69 in one flank 72 of each first profile 64 and to insert into each such recess a coil spring 70 which reacts against the bottom surface in the respective recess and bears against the adjacent flank 71 of the corresponding second profile 65. It is further possible to provide resilient bracing members in the form of coil springs 70 or other springs in recesses of the first profiles 64 as well as in recesses of the second profiles 65.

As mentioned above, the coil springs 70 prevent rattling or other noise which would develop if the first and second profiles 64, 65 were permitted to repeatedly strike against each other. Rattling is especially likely to develop when the engine which drives the first component 3 is idling while the friction clutch 7 is engaged but the transmission including the input element 10 is not shifted into a forward or reverse gear, i.e., when the input element 10 is not called upon to transmit torque to the wheels by way of gears and/or other motion transmitting parts. Generation of rattling or other noise in a conventional vibration damping apparatus wherein the plug-in coupling is not equipped with resilient bracing means is attributable to unavoidable or necessary tolerances between the neighboring flanks 71, 72 of second and first profiles 65 and 64. The noise is characteristic of repeated striking of metallic parts against each other as a result of non-uniform rotation of the output member (e.g., a crankshaft) of the engine which drives the first component 3 and due to inertia of the component 4 together with all parts which rotate therewith. Such parts include the friction clutch 7, the input element 10 (when the clutch 7 is engaged) and the parts (such as gears) which rotate with the input element 10.

In order to reliably prevent the generation of noise, or to at least greatly reduce the noise, it is desirable to select the bracing torque which is generated by the coil springs 70 between the profiles 64 and 65 in such a way that this torque at least matches but preferably exceeds the moments or fluctuations of moments which can develop as a result of changes of angular velocity of the first component 3 due to non-uniform rotation (repeated acceleration and/or deceleration) of the engine, and the moment of inertia of the second component 4 plus the combined moment of inertia of parts (clutch 7 inclusive of the clutch plate 9, input element 10 and the mass of parts which rotate with the input element 10) which rotate with the second component 4. The coil springs 70 are preferably installed in such a way that they are stressed and store additional energy when the engine is coasting, i.e., that the coil springs 70 urge against each other those flanks 72, 71 of the first and second profiles 64, 65 which abut each other and transmit torque when the engine drives the second component 4.

A flange (41) which constitutes a diaphragm spring and has projections 46 engaging the adjacent coil springs 52, 52a of the elastic damper 13 (and which generates the force determining the magnitude of the slip moment of the clutch 43 which is in series with the damper 13) has been found to contribute to simplicity of the improved vibration damping apparatus. The slip clutch 43 can be designed in such a way that the flange 41 constitutes a friction generating part of this slip clutch (this is the case in the apparatus 1 of FIGS. 1 and 2). Alternatively, the slip clutch 43 can be designed in such a way that the flange 41 merely serves to supply force which is necessary to establish friction between certain parts (such as laminations, friction rings, friction discs and/or others) which are in direct contact with each other but do not rub against the flange.

The flange 41 can be modified by providing the recesses for the energy storing elements 52, 52a of the damper 13 radially inwardly of the main section 42. Moreover, the recesses for the energy storing elements 52, 52a can be replaced by windows, i.e., by openings which are completely surrounded by the material of the flange 41.

The abutments or projections 56 and/or 56a can be replaced by abutments or projections which are provided on a separately produced (e.g., disc-shaped) part (not shown) which is affixed to the section 31 (projections 56) or to the section 32 (projections 56a). Such separately produced part or parts can be provided with recesses or windows for the energy storing elements 52 and 52a.

The single chamber 30 can be replaced with several chambers, e.g., with a first chamber for the damper 13 and with a second chamber for the slip clutch 43. The slip clutch 43 is but need not always be installed in the chamber 30.

One of the sections 31, 32 can be made of sheet metal and the other of these sections can be made of a different material (e.g., the other section can constitute a casting). It is equally possible to assemble the component 3 of two sections each of which is a casting.

Figure 3:
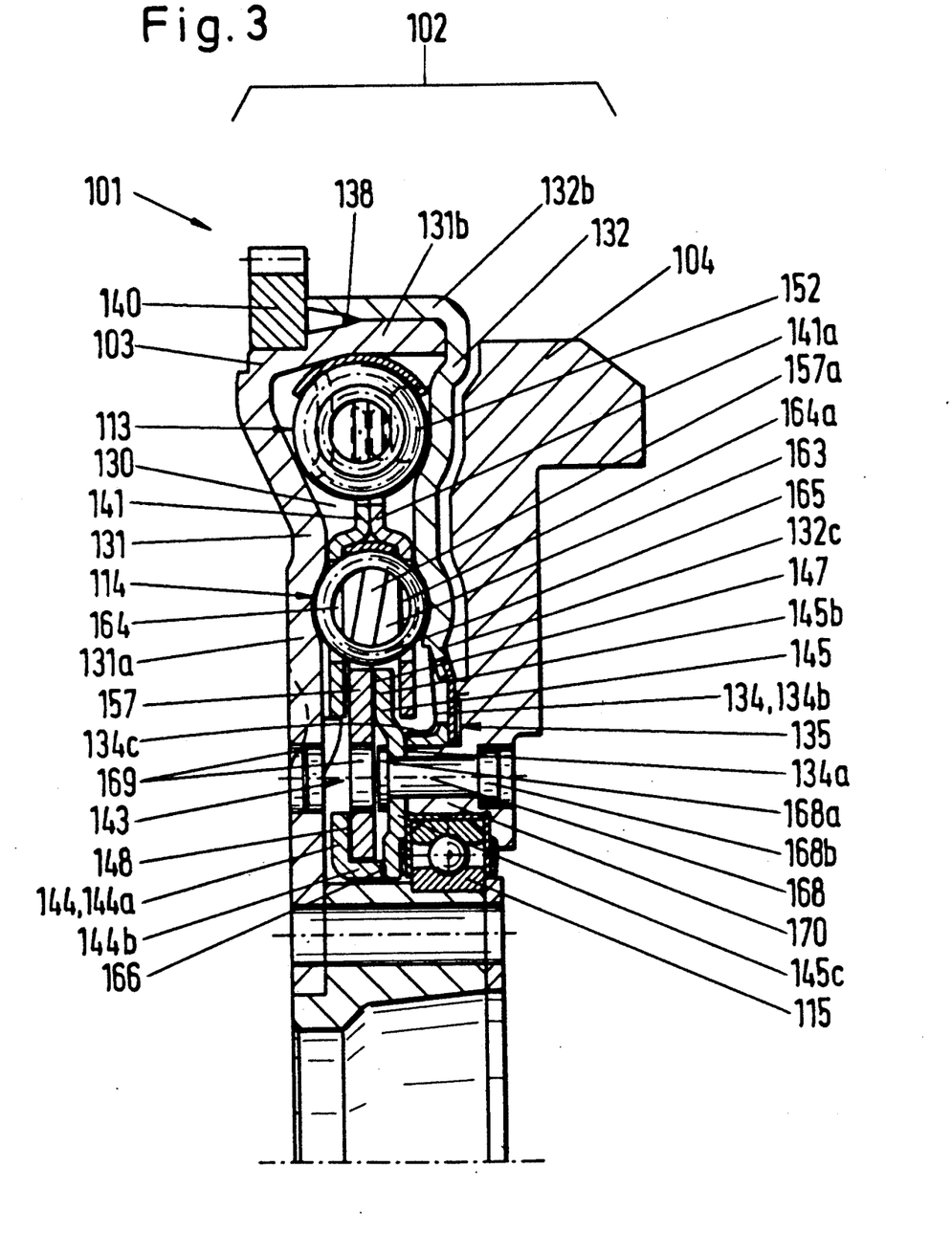
FIG. 3 is a fragmentary axial sectional view of a second vibration damping apparatus.
Figure 4:
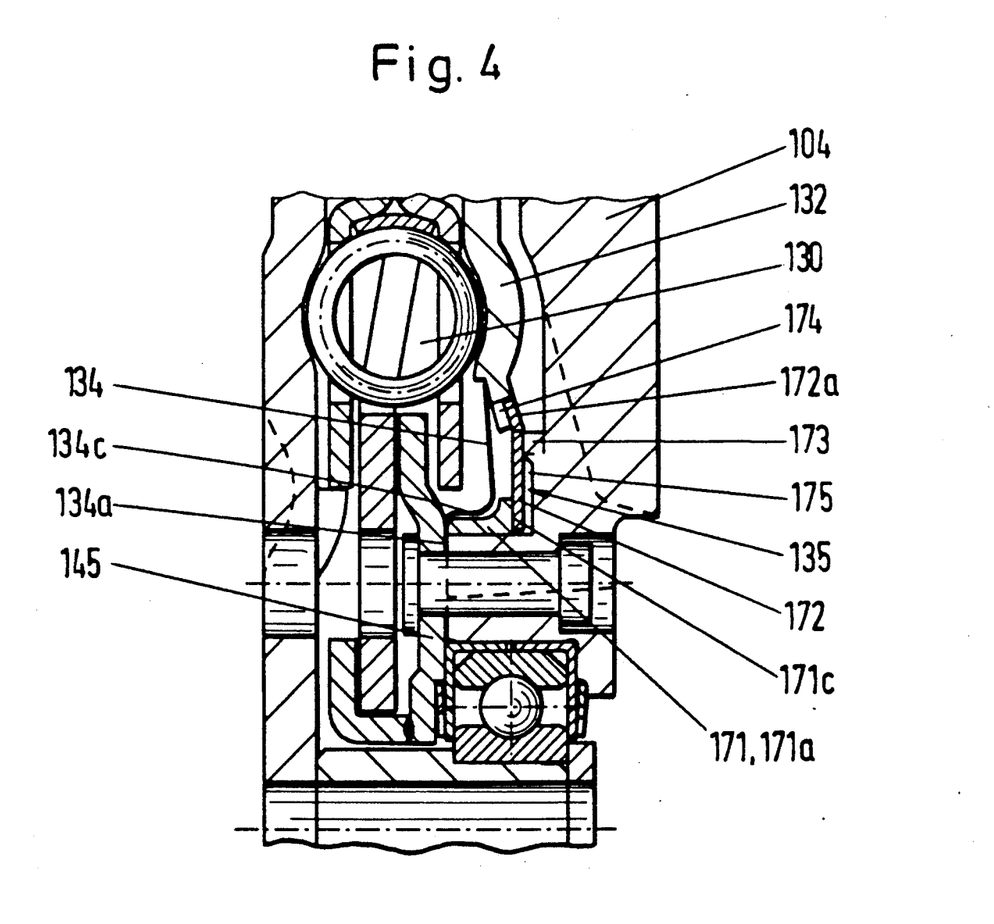
FIG. 4 is an enlarged view of a detail in the structure of FIG. 3.

The vibration damping apparatus 101 which is shown in FIGS. 3 and 4 comprises a composite flywheel 102 with two coaxial components 103 and 104. The component 103 can be connected with the output member (e.g., crankshaft) of an internal combustion engine, and the component 104 can be used to drive the input shaft of a variable-speed transmission, preferably by way of a friction clutch, in a manner as described with reference to the apparatus 1 of FIGS. 1 and 2.

The annular chamber 130 which is defined by the sections 131 and 132 of a housing forming part of the first component 103 confines a first elastic damper 113, a second elastic damper 114 which is disposed radially inwardly of and is in series with the damper 113, and a slip clutch 143 which is connected in series with the damper 114. The sections 131, 132 are made of a metallic sheet material and are provided with axial extensions 131b, 132b which are installed at the radially outermost point of the component 103 in order to increase the inertia of the housing for the chamber 130. These extensions extend axially along the entire length of the damper 113 and overlap each other in such a way that the extension 131b is surrounded by the extension 132b. The starter gear 140 is mounted on the section 131 adjacent the extension 132b of the section 132. A circumferentially complete welded seam 138 is provided to seal the radially outermost portion of the chamber 130 and to establish a reliable mechanical connection between the extensions 131b and 132b. An antifriction bearing 115 with a single row of spherical rolling elements is installed between an axial protuberance of the component 103 and the adjacent radially innermost portion of the component 104.

The input element of the damper 113 is constituted by the sections 131, 132 of the component 103, the same as in the apparatus 1 of FIGS. 1 and 2. These sections have abutments for end convolutions of coil springs 152 constituting the energy storing elements of the damper 113. The output element of the damper 113 is a composite flange which includes two disc-shaped members 141, 141a. These disc-shaped members can be fixedly connected to each other, and their radially outer portions are immediately adjacent one another. The radially inner portions of the members 141, 141a are spaced apart from one another in the axial direction of the components 103, 104. The width of the radially inner portion of each disc-shaped member can equal or approximate the width of the respective radially outer portion (as measured in the radial direction of the component 103). The radially inner portions of the disc-shaped members 141, 141a define an annular space 163 for a disc-shaped member 157. The space 163 can receive a portion of or the entire disc-shaped member 157.

The radially inner portions of the disc-shaped members 141 and 141a are provided with windows 164, 164a for the energy storing elements (coil springs) 165 of the damper 114. The disc-shaped member 157 has radially disposed projections 157a in the form of arms which alternate with the coil springs 165 in the circumferential direction of the component 103. The disc-shaped member 157 is the output element of the damper 114 and is force-lockingly connected with the component 104 by way of the slip clutch 143. To this end, the disc-shaped member 157 is clamped between two disc-shaped stressing members 144, 145 which together constitute the output element of the slip clutch 143. The member 157 is a diaphragm spring and its mounting between the stressing members 144, 145 is analogous to the mounting of flange 41 between the stressing members 44, 45 in the apparatus 1 of FIGS. 1 and 2.

Rivets 168 are provided to fixedly connect the stressing member 145 with the component 104 of the composite flywheel 102. As can be seen in FIG. 3, the radially outer annular portion 145b of the stressing member 145 is axially offset with reference to a radially inner portion 145c which is affixed to the component 104 by the rivets 168. The radially outer portion 145b abuts and stresses the radially outer portion of the disc-shaped member (diaphragm spring) 157. A friction disc 147 is installed between the portion 145b of the stressing member 145 and the axially stressed member 157. The friction disc 147 is fixedly secured to the stressing member 145, e.g., by an adhesive.

Since the portions 145b and 145c of the stressing member 145 are axially offset relative to each other, the portion 145c and the member 157 define a space for reception of the heads 168a of the rivets 168.

The radially inner portion of the axially stressed member 157 bears against the stressing member 144. The radially inner portion of the stressing member 144 has an axial extension 144b which is affixed to the radially inner portion of the stressing member 145. In the apparatus 101 of FIG. 3, the connection between the stressing members 144, 145 includes a welded seam 166. The axial extension 144b can constitute a circumferentially complete sleeve or it can include several prongs which are spaced apart from each other in the circumferential direction of the stressing member 144. It is further possible to replace the axial extension 144b with an axial extension of the stressing member 145 and to weld or otherwise fixedly secure such axial extension to the stressing member 144.

The axial extension 144b of the stressing member 144 further serves as a means for centering the member 157 in the radial direction of the components 103, 104.

A friction ring 148 is installed axially between the radially extending portion 144a of the stressing member 144 and the adjacent portion of the member 157. This friction ring can be loosely inserted (i.e., it need not be fixedly secured to the stressing member 144 or to the member 157) because it is accurately centered by the external surface of the axial extension 144b of the member 144. It is equally possible to adhesively or otherwise fixedly secure the friction ring 148 to the member 144 or 157.

The slip clutch 143 contributes to compactness of the vibration damping apparatus 101 because the torque transmitting connections (rivets 168) between the stressing members 144, 145 (i.e., the output element of the slip clutch) and the second component 104 of the composite flywheel 102 can be disposed at the level (as seen radially of the components 103, 104) of the slip clutch, namely between the rings 147, 148 which are in frictional engagement with each other.

In order to facilitate assembly of the apparatus 101, the radially extending portion 131a of the section 131 and the disc-shaped member 157 are provided with registering openings 169 which facilitate the mounting of rivets 168. Thus, the rivets 168 can be inserted by way of the openings 169, and these openings can thereupon receive back supports or anvils (not shown) for axially propping the rivets during deformation of their ends or heads 168a and 168b. The arrangement may be such that the heads 168a are formed prior to insertion of rivets 168 through the respective pairs of openings 169, and the heads 168b are formed while the heads 168a abut the left-hand side of the stressing member 145. This establishes a rigid connection between the flywheel 102 (namely the component 104) and the output element (including the stressing members 144, 145) of the slip clutch 143. The stressing member 145 is directly riveted to the component 104, and the stressing member 144 is welded (at 166) to the stressing member 145.

The means for sealing the radially inner portion of the chamber 130 from the atmosphere comprises a substantially washer-like sealing element or membrane 134 which is installed between the radially inner portion of section 132 of the component 103 and the component 104. The radially inner portion 134a of the membrane 134 is axially clamped between the component 104 and the stressing member 145. The radially outer portion 134b of the membrane 134 abuts an annular shoulder 132c of the section 132 in such a way that the membrane undergoes a certain amount of deformation and bears against the shoulder 132c in the radial direction of the section 132. This ensures the establishment of a reliable sealing action. The radially inner and outer portions 134a and 134b of the membrane 134 are axially offset relative to each other and are integrally connected to one another by an annular intermediate portion 134c of the membrane.

The component 104 has an axial protuberance 170 which surrounds the bearing 115 and the end face of which abuts the stressing member 145. The rivets 168 are mounted in the protuberance 170 and serve to connect the protuberance with the stressing member 145 as well as (at least indirectly) with the radially inner portion 134a of the membrane 134.

FIG. 4 shows on a larger scale a friction generating or hysteresis device 135 which is mounted on the protuberance 170 of the component 104. The friction generating device 135 is installed outside (namely radially inwardly) of the chamber 130 for the supply of viscous liquid and comprises a friction ring 171 which is centered on the protuberance 170 and includes a sleeve-like or cylindrical portion 171a bearing against the radially inner portion 134a of the membrane 134. The cylindrical portion 171a urges the radially inner portion 134a of the membrane 134 against the stressing member 145. The intermediate portion 134c of the membrane 134 at least partially surrounds the cylindrical portion 171a with at least some clearance (as seen in the radial direction of the component 104). That side of the friction ring 171 which confronts the component 104 constitutes a friction surface 171c which is engaged by the radially inner portion of a prestressed diaphragm spring 172. The radially outer portion of the diaphragm spring 172 abuts an annular rib 173 of the component 104. The purpose of the diaphragm spring 172 is to bias the friction ring 171 toward the radially inner portion 134a of the membrane 134. The rib 173 is located radially outwardly of a ring-shaped depression 175 which is provided in the left-hand side of the component 104 to ensure that the diaphragm spring 172 can act upon the friction ring 171 in cantilever fashion.

In the apparatus 101 of FIGS. 3 and 4, the diaphragm spring 172 directly abuts the axially extending rib 173 of the component 104. However, it is equally within the purview of the invention to insert a friction ring (not shown) between the diaphragm spring 172 and the component 104, and the latter can be provided with an annular shoulder to center the friction ring. Such friction ring can replace the rib 173.

The diaphragm spring 172 is provided with radially outwardly extending projections in the form of prongs 172a which extend into sockets 174 provided therefor in the radially inner portion of the section 132. This ensures that the diaphragm spring 172 is (or can be) nonrotatably coupled to the section 132, i.e., to the component 103. It is presently preferred to select the dimensions of the sockets 174 in such a way that they permit a certain amount of angular displacement of the diaphragm spring 172 and section 132 relative to each other, i.e., the length of the sockets 174 in the circumferential direction of the components 103, 104 preferably exceeds the corresponding dimensions of the prongs 172a. This ensures that the device 135 can generate a so-called delayed friction. Thus, when the direction of rotation of the components 103, 104 relative to each other is changed, the device 135 is ineffective during a certain initial stage of angular movement in the opposite direction, namely during the stage involving an angular movement of the component 103 relative to the component 104 or vice versa until each prong 172a advances from one to the other end of the respective socket 174 (as seen in the circumferential direction of the flywheel 102). A similar delayed friction can be achieved if the prongs 172a are actually connected to the section 132, e.g., by pins which are anchored in the section 132 and extend with a required play into arcuate slots provided in the prongs 172. The positions of the slots and prongs can be reversed.

Figure 5:
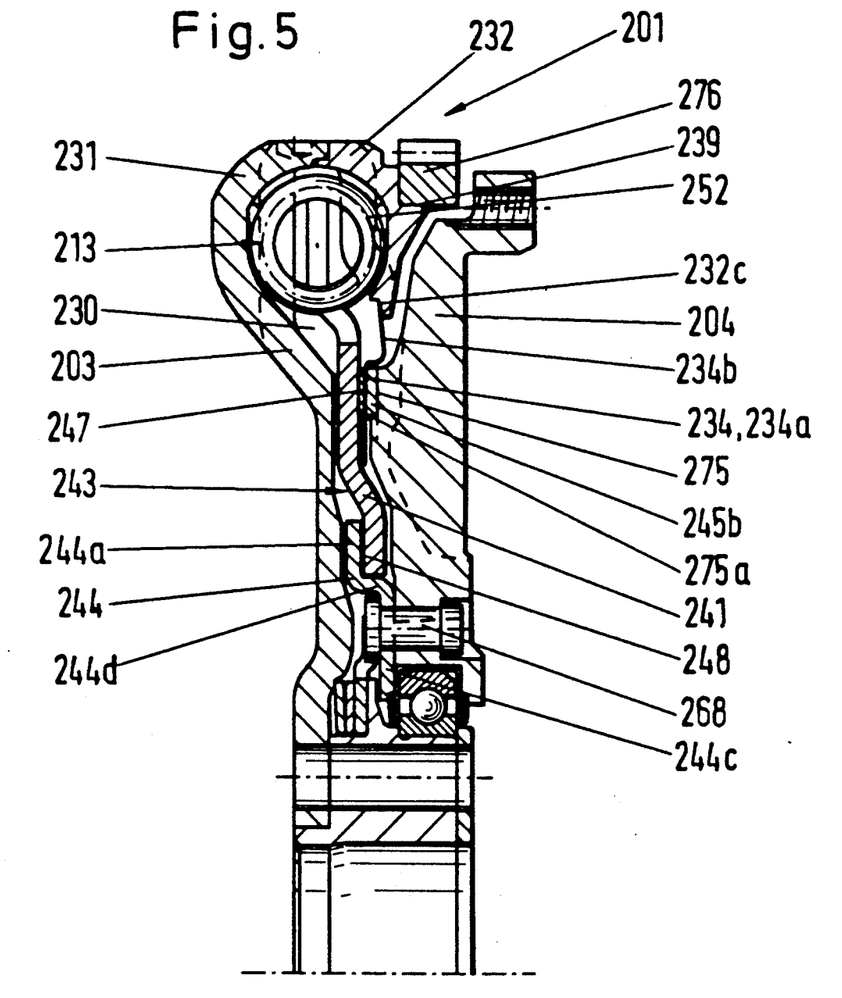
FIG. 5 is a fragmentary axial sectional view of a third vibration damping apparatus.

FIG. 5 shows a portion of a vibration damping apparatus 201 which comprises a composite flywheel including components 203, 204 which are rotatable relative to each other about an anti-friction ball bearing. The component 203 has two sections 231, 232 which define an annular chamber 230 for an elastic damper 213 in the radially outermost portion of the chamber and a slip clutch 243 radially inwardly of the damper 113. Portions of energy storing coil springs 252 of the damper 213 extend into internal grooves of the sections 231, 232 in the same way as described in connection with the apparatus 1 of FIGS. 1 and 2.

A flange-like diaphragm spring 241 constitutes the output element of the damper 213 and the input element of the slip clutch 243. This diaphragm spring is installed in axially stressed condition between the annular portion 244a of a first stressing member 244 and a second stressing member 245b. The annular portion 244a is disposed radially inwardly of the stressing member 245b and constitutes a radially outermost portion of the stressing member 244. The annular radially innermost portion 244c of the stressing member 244 is fixedly secured to the component 204 by rivets 268. The annular portions 244a and 244c are axially offset and are integrally connected to each other by a substantially cylindrical intermediate portion 244d of the stressing member 244. The cylindrical portion 244c is surrounded by and serves as a means for centering the diaphragm spring 241.

A friction ring 248 is inserted axially between the radially outermost portion 244a of the stressing member 244 and the diaphragm spring 241.

The stressing member 245b is a washer which is installed radially outwardly of the stressing member 244 and is carried by the component 204. To this end, that side of the component 204 which faces the component 203 is provided with an axially extending recess 275 bounded at its radially inner end by an annular shoulder 275a which centers the stressing member 245b. The latter is non-rotatably mounted on the component 204, e.g., by providing it with one or more radially inwardly extending projections (not shown) extending into complementary recesses or sockets of the component 204.

The radially outer portion 234b of a sealing element in the form of a membrane 234 is installed between the stressing member 245b and the adjacent portion of the diaphragm spring 241. The membrane 234 contacts a friction ring 247 which directly engages the diaphragm spring 241. The radially inner portion 234a of the membrane 234 extends axially between the stressing member 245b and the friction ring 247. The peripheral surface of the radially outer portion 234b of the membrane 234 abuts a shoulder 232c of the section 232.

An advantage of the vibration damping apparatus 201 is that it occupies little room in the axial direction of the components 203 and 204. This holds especially true for the region of the slip clutch 243 (as seen in the radial direction of the components 203 and 204).

Another advantage of the apparatus 201 is that the diaphragm spring 241 forms part of the means for sealing the chamber 230 for the damper 213 and the slip clutch 243 from the surrounding atmosphere. The sealing action in the region of the stressing members 244, 245b is established as a result of frictional engagement between the diaphragm spring 241 and the stressing member 245b on the one hand and the diaphragm spring 241 and the portion 244a of the stressing member 244 on the other hand. This establishes a seal between the spring 241 and the component 204 which carries the stressing members 244, 245.

A further advantage of the apparatus 201 is that the component 203 can include a relatively small section 232, for example, as compared with the section 32 of the component 3 in the apparatus 1 of FIGS. 1 and 2. The section 232 should be sufficiently large to properly confine the coil springs 252 of the damper 213 and to ensure that the dimensions of the chamber 230 (between the sections 231, 232) suffice to provide room for the damper 213 and slip clutch 243. In fact, the section 232 bounds only a portion of right-hand side of the chamber 230 because the radially inner portion of this chamber is bounded by the membrane 234. All that is necessary is to dimension the section 232 in such a way that it extends radially along and slightly inwardly of the coil springs 252.

The section 232 is provided with a shoulder 239 which centers a starter gear 276.

The improved vibration damping apparatus is susceptible of many additional modifications without departing from the spirit of the invention. For example, one or more features of the apparatus 1 can be incorporated into the apparatus 101 and/or 201, one or more features of the apparatus 101 can be incorporated into the apparatus 1 or 201, and one or more features of the apparatus 201 can be incorporated in the apparatus 1 or 101.

Furthermore, the slip clutch can be installed radially outwardly of the elastic damper or dampers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for damping vibrations, particularly in a power train between an engine and a transmission in a motor vehicle, comprising at least two components which are rotatable relative to each other and include a first component connectable with the engine for transmission of torque between the engine and the first component and a second component connectable with the transmission for transmission of torque between the transmission and the second component; and torque transmitting vibration damping means operating between said first and second components and including at least one elastic damper, a slip clutch arranged to limit the magnitude of torque which is transmitted between the engine and the transmission and means for connecting said slip clutch in series with said damper, said connecting means including a stressed torque-transmitting diaphragm spring which is rotatable relative to said first and second components, the stressing of said diaphragm spring controlling the slip moment of said clutch.

2. The apparatus of claim 1, wherein said diaphragm spring is disc-shaped.

3. The apparatus of claim 1, further comprising means for stressing said diaphragm spring including first and second disc-shaped stressing members in predetermined axial positions relative to each other, said diaphragm spring being disposed between and being axially stressed by said stressing members.

4. The apparatus of claim 1, further comprising a composite flywheel including first and second flywheels respectively constituting said first and second components, antifriction bearing means between said flywheels, and a friction clutch between said second component and the transmission.

5. The apparatus of claim 1, wherein one of said components constitutes an input element of said damper and said diaphragm spring is the output element of said damper, said slip clutch connecting said diaphragm spring with the other of said components.

6. Apparatus for damping vibrations, particularly in a power train between an engine and a transmission in a motor vehicle, comprising at least two components which are rotatable relative to each other and include a first component connectable with the engine and a second component connectable with the transmission, one of said components including sections defining at least one annular chamber having a sealed radially outermost portion and arranged to confine a supply of viscous liquid; and vibration damping means operating between said first and second components and including at least one elastic damper, a slip clutch and means for connecting said slip clutch in series with said damper, said connecting means including a stressed diaphragm spring and at least said damper of said vibration damping means being disposed in said chamber.

7. The apparatus of claim 6, wherein said slip clutch is located in said chamber.

8. The apparatus of claim 6, wherein said sections are dish-shaped.

9. The apparatus of claim 8, wherein at least one of said sections consists of a metallic sheet material.

10. The apparatus of claim 8, wherein said chamber includes an annular compartment and said damper further comprises energy storing elements in said compartment, said compartment being at least partially filled with viscous liquid when said one component rotates.

11. The apparatus of claim 10, wherein at least one of said sections includes abutments for said energy storing elements and said energy storing elements include coil springs.

12. The apparatus of claim 11, wherein said diaphragm spring includes projections extending into said compartment and having abutments for said coil springs.

13. The apparatus of claim 6, wherein said chamber has a radially inner portion and further comprising two annular stressing members flanking said diaphragm spring, one of said stressing members and said diaphragm spring having means for substantially sealing the radially inner portion of said chamber.

14. The apparatus of claim 13, wherein said stressing members have annular portions which stress said diaphragm spring, the annular portion of said one stressing member being located radially outwardly of the annular portion of the other of said stressing members.

15. The apparatus of claim 6, wherein said one component is said first component, said first component including a first section connectable with the engine and having an axial protuberance, and a second section disposed between said first section and said second component and surrounding said protuberance, said sections defining an annular chamber arranged to confine a supply of viscous liquid and receiving at least the damper of said vibration damping means, and further comprising antifriction bearing means interposed between said protuberance and said second component.

16. The apparatus of claim 15, wherein said one chamber includes a sealed radially outermost portion, an annular compartment adjacent said outermost portion, and an innermost portion, said damper including energy storing elements and annular stressing members flanking said diaphragm spring, one of said stressing members being disposed axially between said first section and said diaphragm spring, said one stressing member and said diaphragm spring having means for substantially sealing the innermost portion of said chamber.

17. The apparatus of claim 16, wherein said one stressing member has a first outer diameter and the other of said stressing members has a second outer diameter smaller than said first diameter.

18. Apparatus for damping vibrations, particularly in a power train between an hinge and a transmission in a motor vehicle, comprising at least two components which are rotatable relative to each other and include a first component connectable with the engine and a second component connectable with the transmission; and vibration damping means operating between said first and second components and including at least one elastic damper, a slip clutch arranged to transmit a predetermined maximum torque, means for connecting said slip clutch in series with said damper including a substantially disc-shaped torque transmitting member forming part of said slip clutch and arranged to transmit torque between the engine and the transmission, and two annular disc-shaped stressing members flanking said torque transmitting member, said torque transmitting member being rotatable relative to said annular members when said maximum torque is exceeded, said annular members being radially offset relative to each other and being rotatable with one of said first and second components, at least one of said members being resilient and being installed in stressed condition.

19. Apparatus for damping vibrations, particularly in a power train between an engine and a transmission in a motor vehicle, comprising at least two components which are rotatable relative to each other and include a first component connectable with the engine for transmission of torque between the engine and the first component and a second component connectable with the transmission for transmission of torque between the transmission and the second component; and torque transmitting vibration damping means operating between said first and second components and including at least one elastic damper, a slip clutch arranged to limit the magnitude of torque which is transmitted between said first and second components, means for connecting said slip clutch in series with said damper, said connecting means including a stressed diaphragm spring having windows, the stressing of said diaphragm spring controlling the slip moment of said clutch, and energy storing elements disposed in said windows and acting in the circumferential direction of said components.

20. Apparatus for damping vibrations, particularly in a power train between an engine and a transmission in a motor vehicle, comprising at least two components which are rotatable relative to each other and include a first component connectable with the engine for transmission of torque between the engine and the first component and a second component connectable with the transmission for transmission of torque between the transmission and the second component; torque transmitting vibration damping means operating between said first and second components and including at least one elastic damper, a slip clutch arranged to limit the magnitude of torque which is transmitted between said first and second components and means for connecting said slip clutch in series with said damper, said connecting means including a stressed diaphragm spring, the stressing of said diaphragm spring controlling the slip moment of said clutch; and means for stressing said diaphragm spring including first and second annular stressing members one of which is disposed at least in part radially outwardly of the other stressing member, said diaphragm spring being disposed between said stressing members and said stressing members being maintained in predetermined axial positions relative to each other.

21. The apparatus of claim 20, further comprising means for non-rotatably securing said stressing members to one of said component.

22. Apparatus for damping vibrations, particularly in a power train between an engine and a transmission in a motor vehicle, comprising at least two components which are rotatable relative to each other and include a first component connectable with the engine for transmission of torque between the engine and the first component and a second component connectable with the transmission for transmission of torque between the transmission and the second component; and torque transmitting vibration damping means operating between said first and second components and including at least one elastic damper, a slip clutch arranged to limit the magnitude of torque which is transmitted between said first and second components, means for connecting said slip clutch in series with said damper including a stressed diaphragm spring having a stressed annular main section which determines the slip moment of said clutch and windows outside of said main section, the stressing of said main section of said diaphragm spring controlling the slip moment of said clutch, and energy storing element disposed in said windows and acting in the circumferential direction of said components.

23. The apparatus of claim 22, wherein said windows are disposed radially outwardly of said main section.

24. The apparatus of claim 22, wherein said diaphragm spring further comprises radial projections extending from said main section and alternating with said windows.

25. The apparatus of claim 24, wherein said projections extend radially outwardly of said main section and each of said energy storing elements is acted upon by one of said projections.

26. Apparatus for damping vibrations, particularly in a power train between an engine and a transmission in a motor vehicle, comprising at least two components which are rotatable relative to each other and include a first component connectable with the engine for transmission of torque between the engine and the first component and a second component connectable with the transmission for transmission of torque between the transmission and the second component; torque transmitting vibration damping means operating between said first and second components and including at least one elastic damper, a slip clutch arranged to limit the magnitude of torque which is transmitted between said first and second components and means for connecting said slip clutch in series with said damper, said connecting means including a stressed diaphragm spring, the stressing of said diaphragm spring controlling the slip moment of said clutch, means for stressing said diaphragm spring including first and second disc-shaped stressing members in predetermined axial positions relative to each other, said diaphragm spring being disposed between and being axially stressed by said stressing members; and means for fixedly securing said stressing members to each other against axial movement with reference to one another.

27. Apparatus for damping vibrations, particularly in a power train between an engine and a transmission in a motor vehicle, comprising at least tow components which are rotatable relative to each other and include a first component connectable with the engine for transmission of torque between the engine and the first component and a second component connectable with the transmission for transmission of torque between the transmission and the second component; and torque transmitting vibration damping means operating between said first and second components and including at least one elastic damper, a slip clutch arranged to limit the magnitude of torque which is transmitted between said first and second components, means for connecting said slip-clutch in series with said damper, said connecting means including a stressed diaphragm spring and the stressing of said diaphragm spring controlling the slip moment of said clutch, and energy storing elements, said diaphragm spring having windows for portions of said energy storing elements and one of said components having first abutments for said energy storing elements, said diaphragm spring having second abutments for said energy storing elements and each energy storing element being disposed between a said first and a said second abutment in the circumferential direction of said components and being stressed in response to angular movement of said one component and said diaphragm spring relative to each other.

28. Apparatus for damping vibrations, particularly in a power train between an engine and a transmission in a motor vehicle, comprising at least two components which are rotatable relative to each other and include a first component connectable with the engine for transmission of torque between the engine and the first component and a second component connectable with the transmission for transmission of torque between the transmissions and the second component; torque transmitting vibration damping means operating between said first and second components and including at least one elastic damper, a slip clutch arranged to limit the magnitude of torque which is transmitted between said first and second components and means for connecting said slip clutch in series with said damper, said connecting means including a stressed diaphragm spring and the stressing of said diaphragm spring controlling the slip moment of said clutch; two substantially disc-shaped stressing members flanking said diaphragm spring; and plug-in means for non-rotatably and axially movably coupling said stressing members to said second component.

29. The apparatus of claim 28, at least one of said stressing members including a radially innermost portion, said coupling means comprising first profiles provided on said one stressing member and second profiles carried by said second component.

30. The apparatus of claim 29, wherein said coupling means further comprises means for bracing said first profiles against said second profiles in the circumferential direction of said components.

31. The apparatus of claim 30, wherein the bracing moment is greater than (a) the moments which are generated by variations of rotational speed due to non-uniformity of rotation of the engine, and (b) the moment of inertia of said second component.

32. The apparatus of claim 30, wherein the bracing moment of said coupling means is greater than (a) the moments which are generated as a result of variations of angular velocity due to non-uniformity of rotation of the engine and (b) the moment of inertia of the second component and of parts connected thereto.

33. The apparatus of claim 30, wherein the bracing moment of said coupling means is between 5 and 30 Nm.

34. The apparatus of claim 33, wherein said bracing moment is between 8 and 20 Nm.

35. The apparatus of claim 29, further comprising a friction clutch between said second component and the transmission and a substantially disc-shaped member secured to said second component, said second profiles being provided at the periphery of said disc-shaped member.

* * * * *